(12) United States Patent
Kim

(10) Patent No.: US 12,020,220 B2
(45) Date of Patent: Jun. 25, 2024

(54) SYSTEM AND METHOD FOR TRANSMITTING INFORMATION USING MOBILE TERMINAL

(71) Applicant: Allink Co., Ltd., Seoul (KR)

(72) Inventor: Kyung Dong Kim, Seongnam-si (KR)

(73) Assignee: Allink Co., Ltd., Seoul (KR)

( * ) Notice: Subject to any disclaimer, the term of this patent is extended or adjusted under 35 U.S.C. 154(b) by 520 days.

(21) Appl. No.: 17/289,232

(22) PCT Filed: Feb. 18, 2021

(86) PCT No.: PCT/KR2021/002088
§ 371 (c)(1),
(2) Date: Apr. 28, 2021

(87) PCT Pub. No.: WO2021/167382
PCT Pub. Date: Aug. 26, 2021

(65) Prior Publication Data
US 2022/0318781 A1    Oct. 6, 2022

(30) Foreign Application Priority Data
Feb. 19, 2020    (KR) .................. 10-2020-0020635

(51) Int. Cl.
*G06Q 20/02*    (2012.01)
*G06K 7/10*    (2006.01)
(Continued)

(52) U.S. Cl.
CPC ........... *G06Q 20/02* (2013.01); *G06Q 20/085* (2013.01); *G06Q 20/202* (2013.01);
(Continued)

(58) Field of Classification Search
CPC .... G06Q 20/02; G06Q 20/085; G06Q 20/202; G06Q 20/322; G06Q 20/385;
(Continued)

(56) References Cited

U.S. PATENT DOCUMENTS 8,744,958 B2    6/2014  Carlson et al.
9,195,984 B1    11/2015 Spector et al.
(Continued)

FOREIGN PATENT DOCUMENTS

JP    2018-014088 A    1/2018
KR    10-2014-0071607 A    6/2014
(Continued)

OTHER PUBLICATIONS

W. Liu, X. Wang and W. Peng, "State of the Art: Secure Mobile Payment," in IEEE Access, vol. 8, pp. 13898-13914, 2020, doi: 10.1109/ACCESS.2019.2963480. (Year: 2020).*

(Continued)

*Primary Examiner* — Elda G Milef
(74) *Attorney, Agent, or Firm* — Park, Kim & Suh, LLC

(57) ABSTRACT

The present invention provides a method for transmitting information using a mobile terminal, comprising: receiving, by an information transmission server, a payload and a destination terminal ID from the mobile terminal; determining, by the information transmission server, a destination terminal to which the payload is to be transmitted, using the destination terminal ID; generating, by the information transmission server, an instruction to be executed by a forwarding program which is installed at a destination terminal; and transmitting, by the information transmission server, the instruction and the payload to the forwarding program. The method according to the present invention has an advantage that when information stored in a user's mobile terminal needs to be transmitted to a certain destination terminal, such information can be transmitted effectively and efficiently through a unified and integrated system regardless of types of applications provided by various service providers.

15 Claims, 6 Drawing Sheets

(51) Int. Cl.

| | |
|---|---|
| *G06K 19/06* | (2006.01) |
| *G06K 19/07* | (2006.01) |
| *G06Q 20/08* | (2012.01) |
| *G06Q 20/20* | (2012.01) |
| *G06Q 20/32* | (2012.01) |
| *G06Q 20/38* | (2012.01) |
| *H04W 88/02* | (2009.01) |

(52) U.S. Cl.
CPC ......... *G06Q 20/322* (2013.01); *G06Q 20/385* (2013.01); *G06K 7/10297* (2013.01); *G06K 19/06037* (2013.01); *G06K 19/0723* (2013.01); *G06Q 20/3276* (2013.01); *G06Q 20/3278* (2013.01); *H04W 88/02* (2013.01)

(58) Field of Classification Search
CPC ........... G06Q 20/3276; G06Q 20/3278; G06Q 20/204; G06Q 20/3263; G06Q 20/3274; G06Q 20/401; G06Q 20/327; G06Q 20/326; G06Q 20/3255; G06Q 20/352; G06Q 20/4014; G06Q 20/14; G06K 7/10297; G06K 19/06037; G06K 19/0723; H04W 88/02; G07G 1/06; G07G 1/14; H04L 67/146
See application file for complete search history.

(56) References Cited

U.S. PATENT DOCUMENTS

| | | | |
|---|---|---|---|
| 9,311,659 | B2 | 4/2016 | Fisher |
| 10,311,428 | B2 | 6/2019 | Bush et al. |
| 10,990,947 | B2 | 4/2021 | Rizvi et al. |
| 2009/0112768 | A1 | 4/2009 | Hammad et al. |
| 2012/0078789 | A1 | 3/2012 | Harell |
| 2013/0246259 | A1 | 9/2013 | Dessert et al. |
| 2014/0074605 | A1* | 3/2014 | Sanchez ................ G06Q 40/03 |
| | | | 705/14.64 |
| 2015/0142541 | A1 | 5/2015 | Fisher |
| 2015/0237664 | A1 | 8/2015 | Tanabe |
| 2016/0012465 | A1* | 1/2016 | Sharp .................. G06Q 20/321 |
| | | | 705/14.17 |
| 2016/0055477 | A1 | 2/2016 | Guérin et al. |
| 2020/0034821 | A1 | 1/2020 | Agrawal et al. |
| 2020/0327526 | A1* | 10/2020 | Rogers .................. G06Q 20/20 |

FOREIGN PATENT DOCUMENTS

| | | | | |
|---|---|---|---|---|
| KR | 10-2015-0109635 A | 10/2015 | | |
| KR | 10-1557895 B1 | 10/2015 | | |
| KR | 10-2015-0137380 A | 12/2015 | | |
| KR | 10-2015-0138868 A | 12/2015 | | |
| KR | 10-2016-0133302 A | 11/2016 | | |
| KR | 10-2017-0022303 A | 3/2017 | | |
| KR | 10-2017-0099340 A | 8/2017 | | |
| KR | 10-2017-0134162 A | 12/2017 | | |
| KR | 20170134162 A | * | 12/2017 | ............... G06K 7/10 |
| RU | 2617548 C2 | 4/2017 | | |
| RU | 2644132 C2 | 2/2018 | | |

OTHER PUBLICATIONS

Naver blog. Oct. 29, 2015. Geum Economist. AppCard? You Can Even Pay with Only a Cell Phone???, Retrieved from: <URL: https://m.blog.naver.com/PostVies.nhn?blogId=fss2009&logNo=220521228970&proxyReferer=https:%2F%2Fwww.google.com%2F>, pp. 1-9.

* cited by examiner

[Fig. 1]
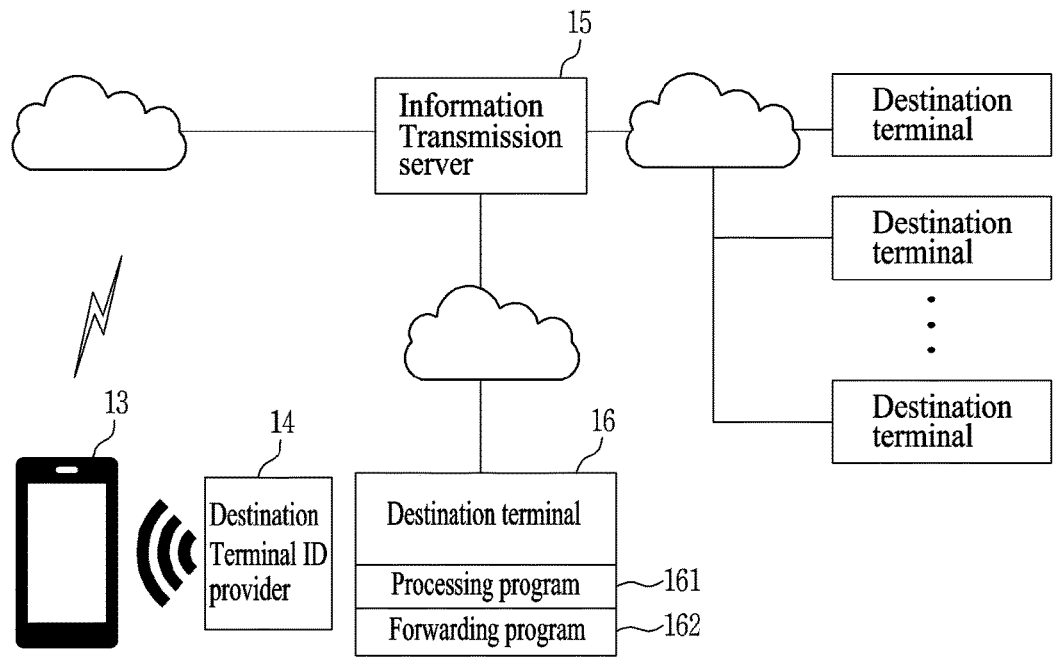
[Fig. 2]
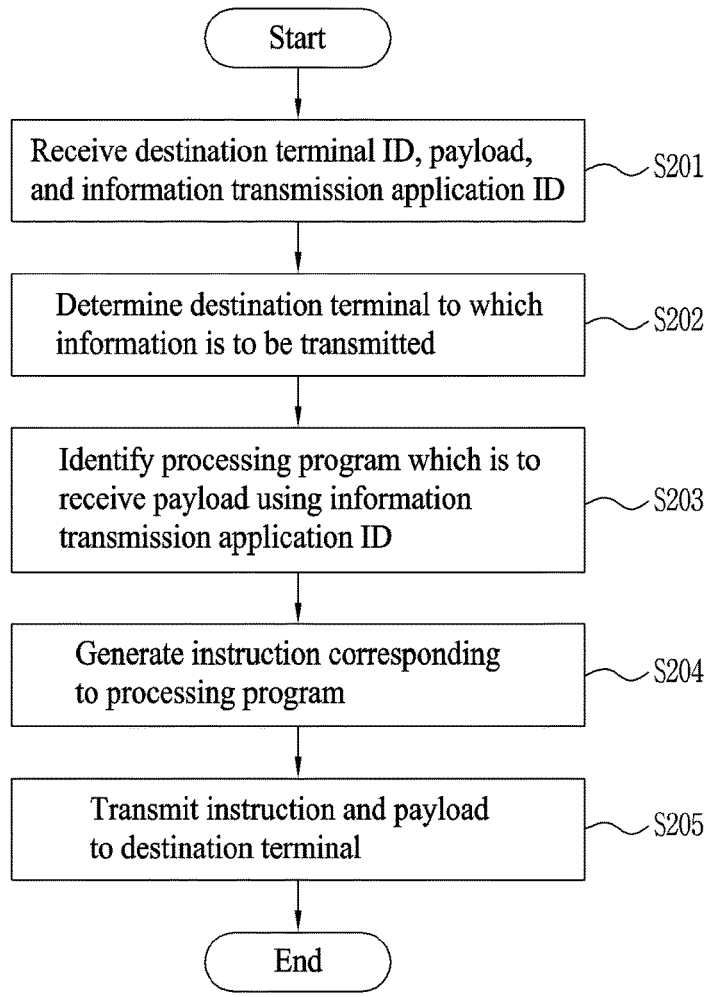

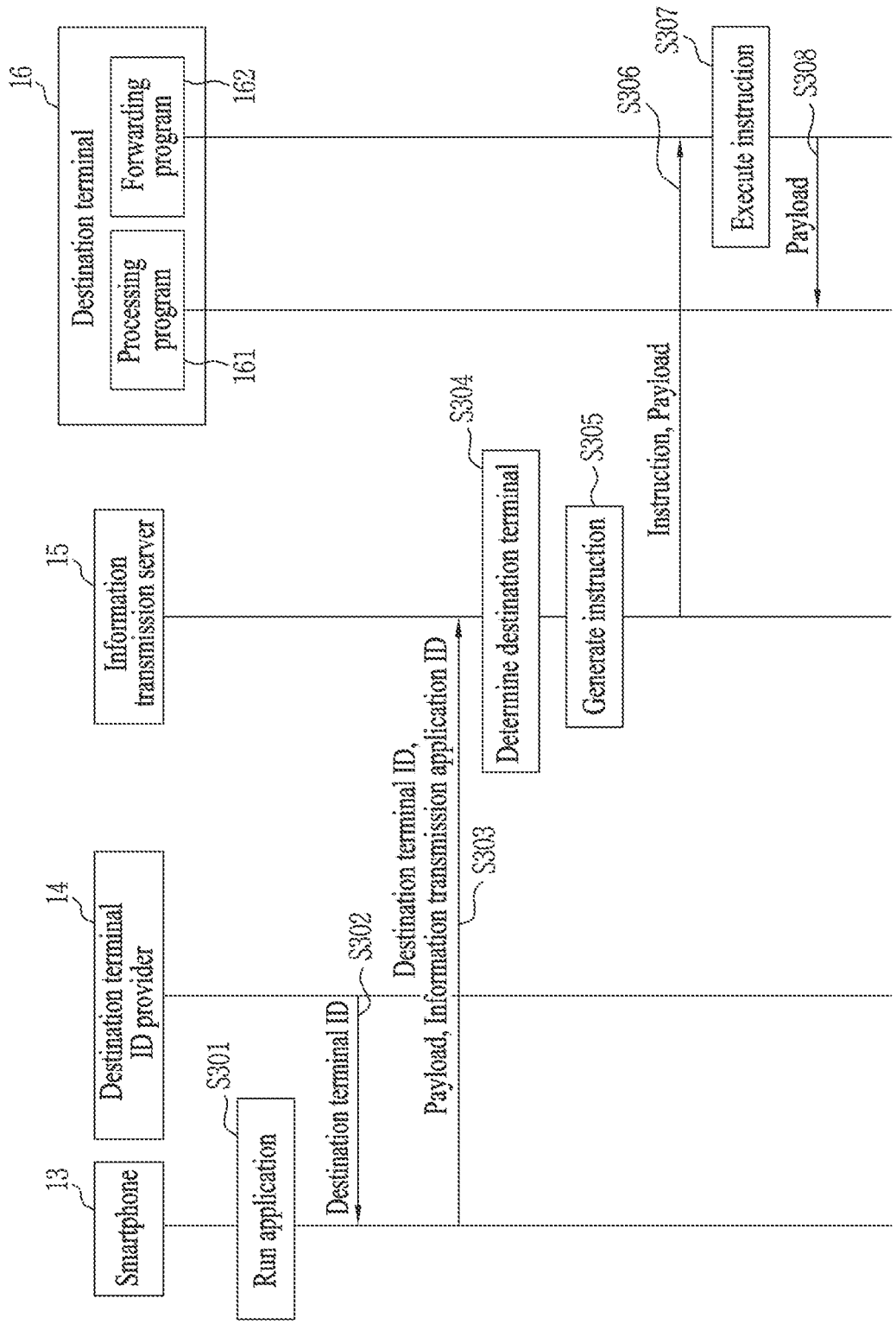

[Fig. 4]
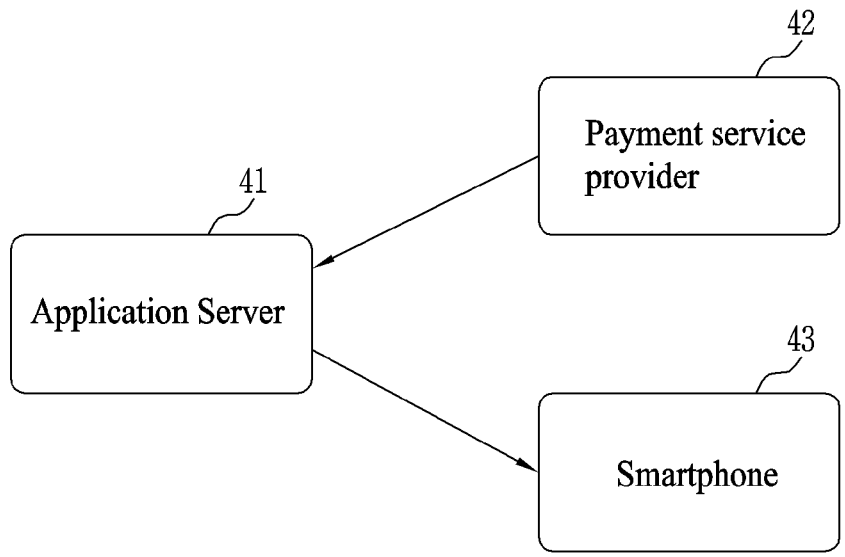
[Fig. 5]
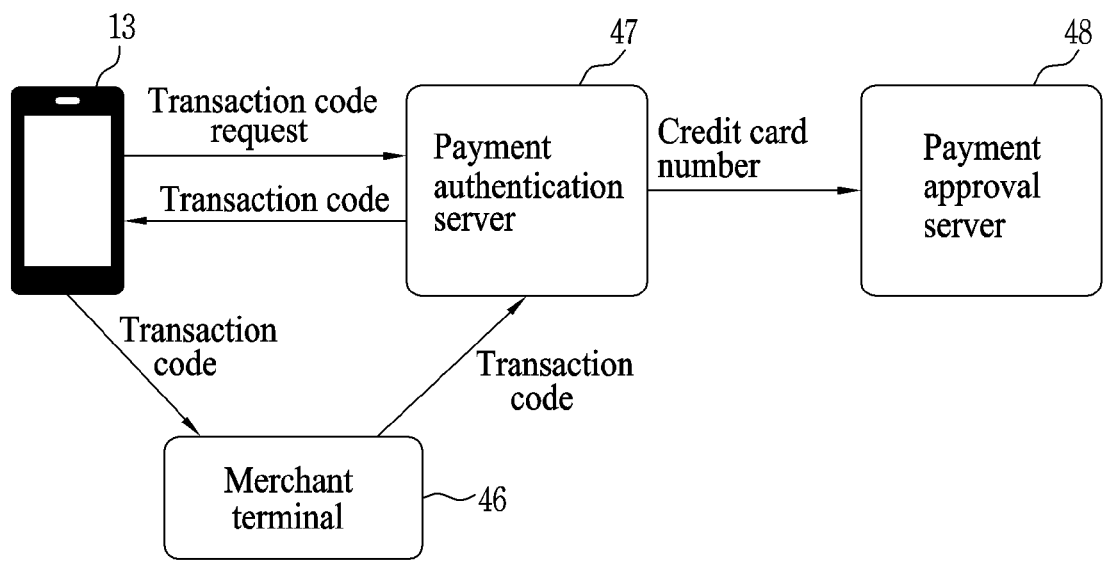

[Fig. 6]
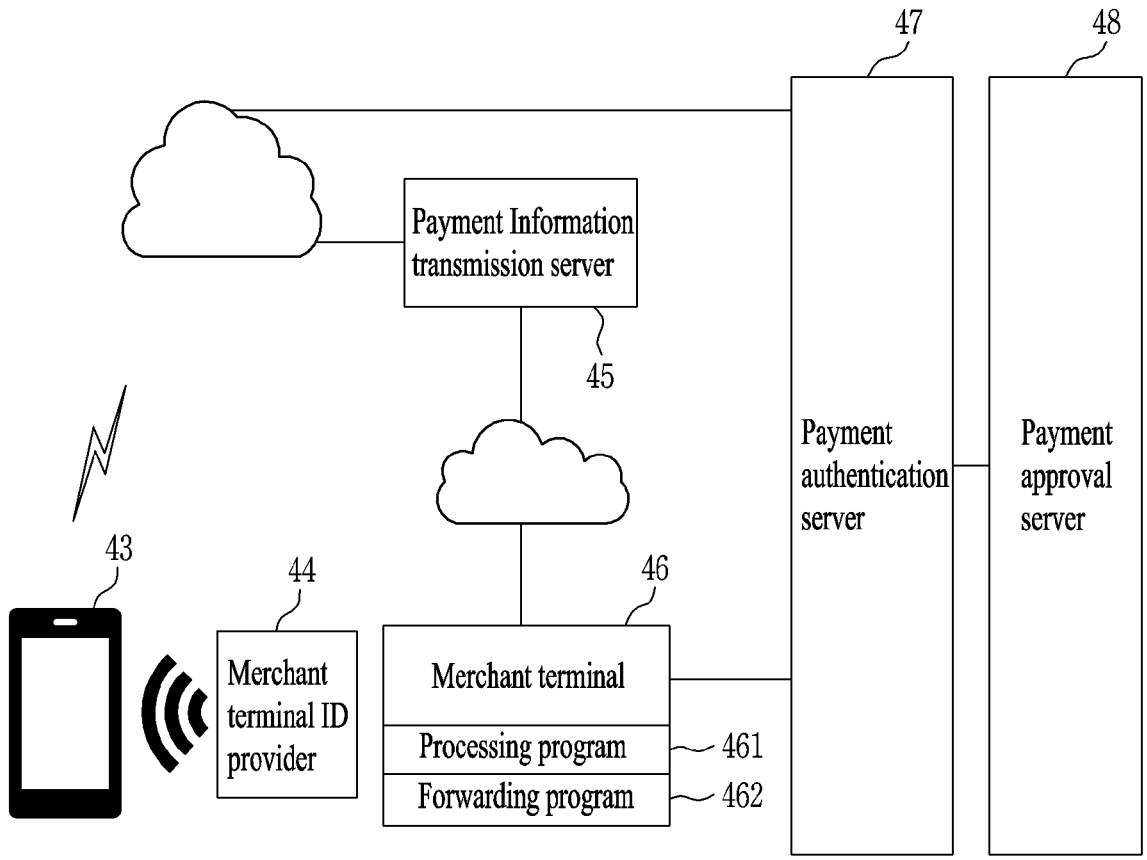
[Fig. 7]
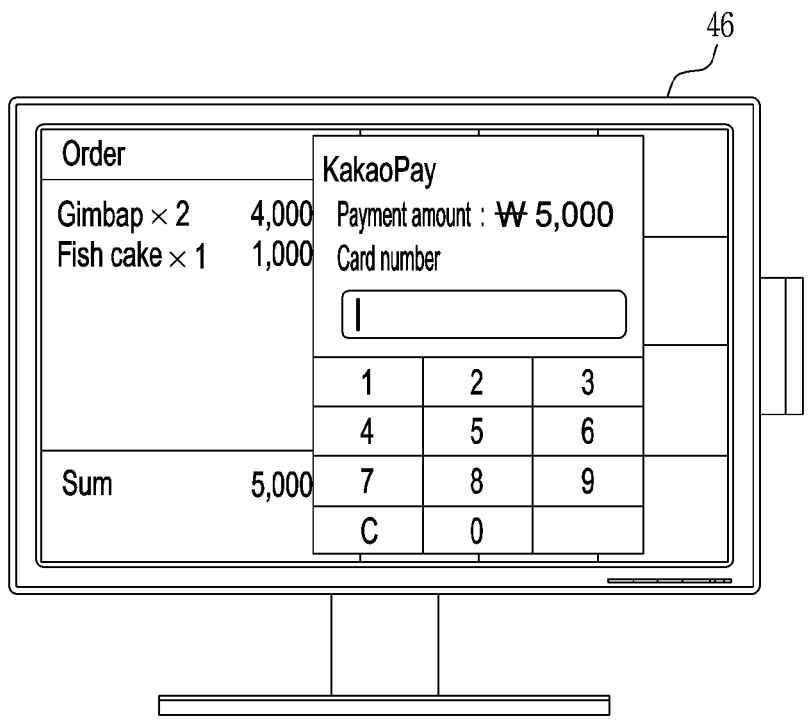

[Fig. 8]
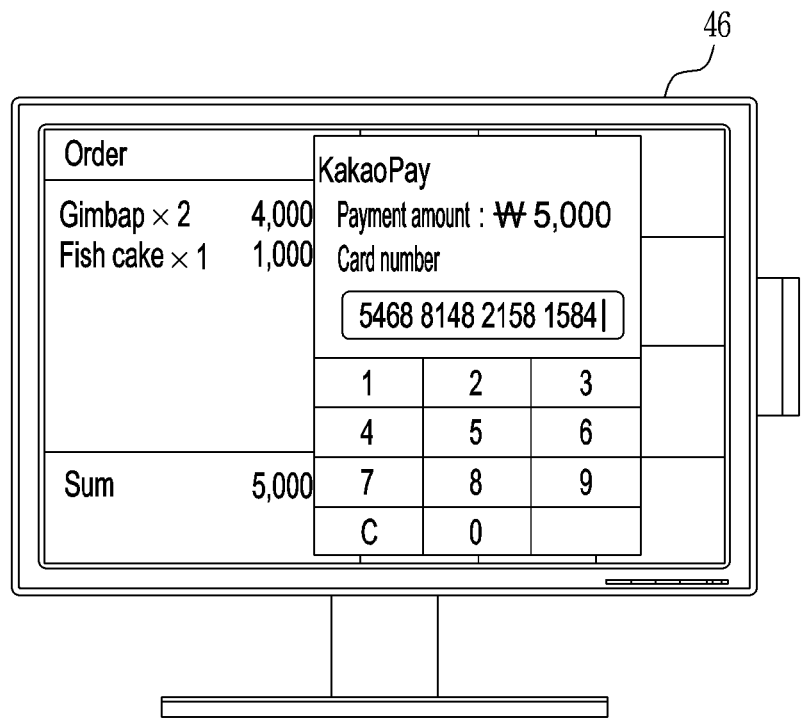

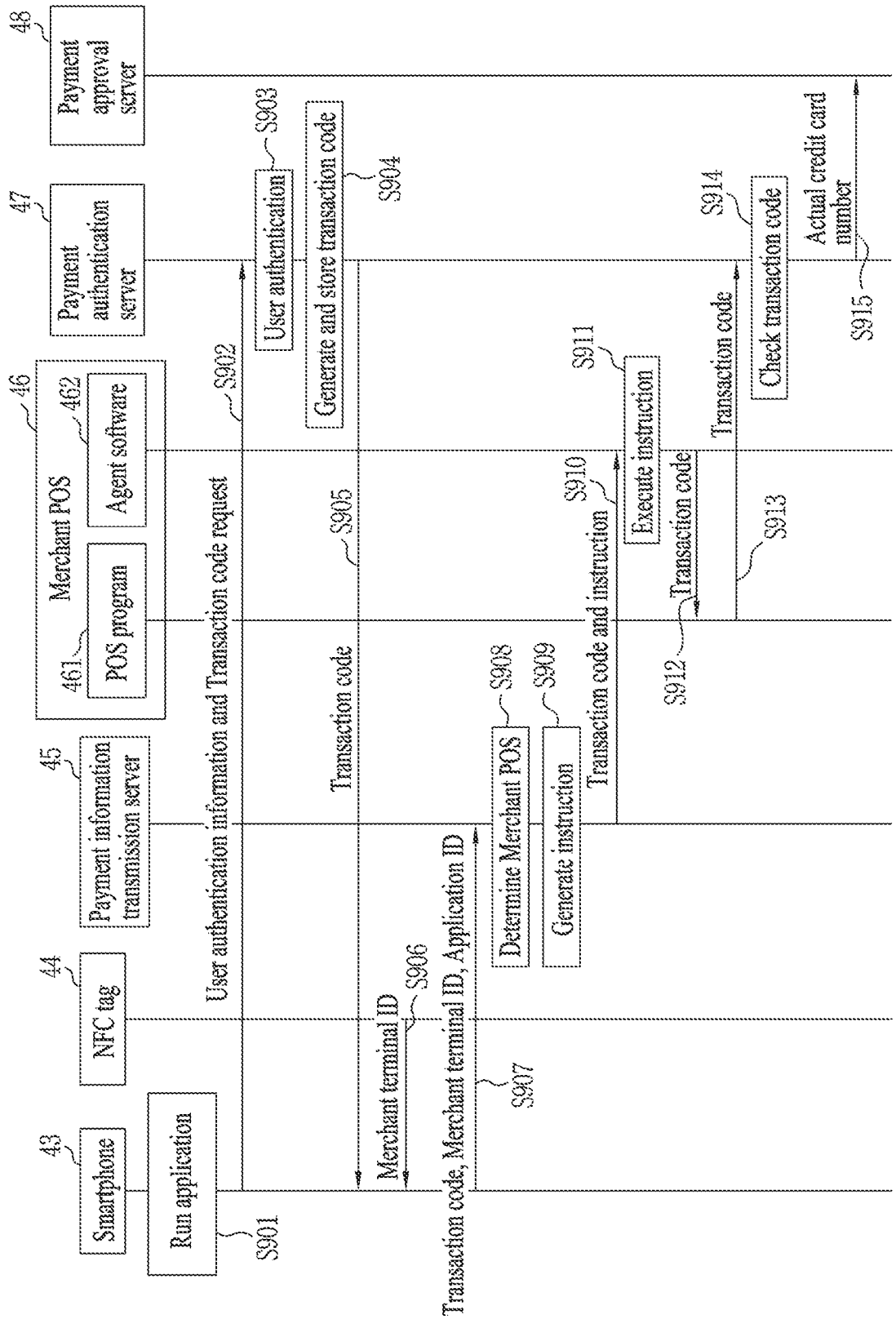

SYSTEM AND METHOD FOR TRANSMITTING INFORMATION USING MOBILE TERMINAL

CROSS-REFERENCE TO RELATED APPLICATIONS

This application is a National Phase Application of PCT International Application No. PCT/KR2021/002088, which was filed on Feb. 18, 2021, and which claims priority from Korean Patent Application No. 10-2020-0020635 filed on Feb. 19, 2020. The disclosures of the above patent applications are incorporated herein by reference in their entirety.

TECHNICAL FIELD

The present invention relates to a system for transmitting information using a mobile terminal and a method thereof, and more particularly, to a system for transmitting information and a method thereof capable of efficiently transmitting information in a mobile terminal despite a plurality of applications provided by various service providers.

BACKGROUND ART

Recently, a personal mobile terminal such as a smartphone has been widely distributed. The personal mobile terminal such as the smartphone has been developed to perform not only a function of a telephone for communicating with the other party, but also functions of Internet access, multimedia viewing, and mobile payment.

As the function of the smartphone expands, it becomes available to pay for goods purchased at offline stores or to accumulate or deposit rewards in a member account using an application installed on the smartphone.

When payment or reward deposit is performed using the mobile terminal such as the smartphone, it is required to transmit information such as a card number or a member ID stored in the smartphone to a terminal of a retail store.

Recently, various service providers not only provide payment means in online shopping malls, but also launch even into a payment business at the offline stores using the smartphone, and as a result, various payment plans have been adopted for each service provider.

Particularly, as the number of payment service providers using the smartphone increases, types of payment plans also increase, and thus, many problems occur.

Specifically, in order to perform the payment using the smartphone in the offline store, payment information such as the credit card information or the member ID stored in the smartphone needs to be transmitted to a merchant terminal such as a point of sale (POS) system, but interface devices for transmitting the payment information stored in the smartphone to the POS system are not unified, and thus, each user transmits the payment information using different unique interface devices.

For example, some payment service providers provide dedicated near field communication (NFC) readers to read the payment information from the smartphones, while some payment service providers provide a magnetic secure transmission (MST) method to use a conventional magnetic card infrastructure without modification. In addition, some payment service providers provide a method of reading a quick response (QR) code displayed on a user's smartphone with a reader, and other payment service providers provide a method of reading a barcode displayed on the user's smartphone, and some payment service providers also use these methods in combination.

As such, as each payment service provider independently establishes a hardware interface for the payment and the reward deposit, confusion and inconvenience of users are increased, and this becomes a major obstacle to growth of mobile payment market for the offline store using the smartphone.

Furthermore, even in an aspect of offline merchants, there is a problem in that whenever a new payment service provider comes up, a new hardware for reading the payment information from the smartphone needs to be added, a new payment software program on the POS system needs to be installed, and clerks working at a merchant's store need to be educated to process each payment plan.

Accordingly, unified interface system and method are needed with which the smartphone is able to effectively transmit the payment information, the member information and so forth to a certain destination terminal, despite of various service providers.

DISCLOSURE OF INVENTION

Technical Problem

The present invention is contemplated to solve problems in the prior art mentioned above. Thus, an object of the present invention is to provide a system and a method for efficiently transmitting information stored in a user's terminal to a destination terminal.

Solution to Problem

To solve the above problems, the present invention provides a method for transmitting information using a mobile terminal, comprising: receiving, by an information transmission server, a payload and a destination terminal ID from the mobile terminal; determining, by the information transmission server, a destination terminal to which the payload is to be transmitted, using the destination terminal ID; generating, by the information transmission server, an instruction to be executed by a forwarding program which is installed at the destination terminal; and transmitting, by the information transmission server, the instruction and the payload to the forwarding program.

Details of examples or implementations will be described in the following with reference to the accompanying drawings. Other features will be apparent from the description and drawings, and from the claims.

Advantageous Effects of Invention

The system and method according to the present invention have the technical advantages as follows.

When information stored in a user's mobile terminal needs to be transmitted to a certain destination terminal, such information can be transmitted effectively and efficiently through a unified and integrated system regardless of types of applications provided by various service providers.

As payment hardware and process in an offline store are substantially consolidated in a single structure by applying the system and method of the present invention, convenience of a retailer as well as a user of the mobile terminal can be enhanced.

Any information can be efficiently transmitted to any merchant terminal without the hardware like a separate reader or scanner for reading transaction information from the user's mobile terminal.

BRIEF DESCRIPTION OF DRAWINGS

The present invention will become more fully understood from the detailed description given herein below and the accompanying drawings, which are given by illustration only, and thus are not intended to limit the scope of the present Invention, wherein:

FIG. 1 illustrates an information transmission system according to an embodiment of the present invention;

FIG. 2 illustrates a process of transmitting an instruction at an information transmission server according to an embodiment of the present invention;

FIG. 3 illustrates a signal processing diagram of an information transmission method according to an embodiment of the present invention;

FIG. 4 illustrates a process of downloading a payment service application for transmitting payment information according to an embodiment of the present invention;

FIG. 5 illustrates a process of authenticating a transaction using a transaction code;

FIG. 6 illustrates a payment information transmission system according to an embodiment of the present invention;

FIGS. 7 and 8 illustrate a process of transmitting the transaction code to a POS program according to an embodiment of the present invention; and FIG. 9 illustrates a signal processing diagram of the payment information transmission system in FIG. 6 according to an embodiment of the present invention.

BEST MODE FOR CARRYING OUT THE INVENTION

Description will now be given in detail according to examples disclosed herein, with reference to the accompanying drawings. For the sake of brief description with reference to the drawings, the same or equivalent components may be provided with the same reference numbers, and description thereof will not be repeated. In the following, any conventional art which is well-known to one of ordinary skill in the relevant art has generally been omitted for the sake of brevity. The accompanying drawings are used to help easily understand various technical features and it should be understood that the examples presented herein are not limited by the accompanying drawings. As such, the present invention should be construed to extend to any alterations, equivalents and substitutes in addition to those which are particularly set out in the accompanying drawings.

A singular representation may include a plural representation unless it represents a definitely different meaning from the context.

Terms such as "comprise", "include" or "have" are used herein and should be understood that they are intended to indicate an existence of several components, functions or steps, disclosed in the specification, and it is also understood that greater or fewer components, functions, or steps may likewise be utilized. Moreover, due to the same reasons, it is also understood that the present invention includes a combination of features, numerals, steps, operations, components, parts and the like partially omitted from the related or involved features, numerals, steps, operations, components and parts described using the aforementioned terms unless deviating from the intentions of the original disclosure.

FIG. 1 illustrates an information transmission system according to an embodiment of the present invention.

Referring to FIG. 1, the information transmission system according to the present invention includes a mobile terminal 13, a destination terminal ID provider 14, an information transmission server 15, and a destination terminal 16. The information transmission system further includes a processing program 161 and a forwarding program 162 installed at the destination terminal 16.

The destination terminal ID provider 14 has identification information, i.e., an identifier (ID) corresponding to the destination terminal 16. The destination terminal ID may be implemented in the form of a quick response (QR) code, a barcode, or a near field communication (NFC) tag. It may be preferable to implement the destination terminal ID in the NFC tag for user convenience. Accordingly, an embodiment using the NFC tag as the destination terminal ID provider 14 will be described in the following.

The mobile terminal 13 may be any device having a function of obtaining the destination terminal ID from the destination terminal ID provider 14 and transmitting the obtained destination terminal ID to the information transmission server 15. For example, the mobile terminal 13 may be a smartphone, a tablet PC and the like. In the following, an embodiment using the smartphone as the mobile terminal 13 will be described.

In order to have desired information to be processed at the destination terminal 16, a user executes an information transmission application installed at the user's own smartphone 13 and tags the smartphone 13 on the NFC tag 14 to obtain the destination terminal ID. For example, the information transmission application may correspond to an application such as a membership application for reward deposit, a payment application, and so on, which is configured to transmit specific information, i.e., a membership ID, a transaction code, and so forth to the destination terminal.

When the smartphone 13 obtains the destination terminal ID from the destination terminal ID provider, i.e., the NFC tag 14, the smartphone 13 transmits the destination terminal ID and a predetermined payload to the information transmission server 15. The payload refers to target information transmitted from the smartphone 13 to the destination terminal 16 to be processed by any compatible program in the destination terminal 16 for performing a predetermined or intended function. For example, the payload may be credit card information for payment, a member ID for reward deposition and so on. Further, the smartphone 13 may transmit not only the destination terminal ID and the payload, but also an information transmission application ID.

The information transmission server 15 determines the destination terminal 16 to which the received payload is transmitted among a plurality of destination terminals 16 connected to the information transmission server 15. The destination terminal ID received from the smartphone 13 is used to determine the destination terminal 16 to which the payload is to be transmitted.

The information transmission server 15 stores or recognizes a type of the processing program 161 installed at the destination terminal 16 in advance, and an information transmission method performed by the forwarding program 162 is determined according to the type of the processing program 161 installed at the destination terminal 16.

The information transmission server 15 transmits an instruction corresponding to the type of the processing program 161 installed in the destination terminal 16 to the forwarding program 162 of the destination terminal 16, in order to define the information transmission method for properly transmitting the received payload to the processing program 161.

In one embodiment, when there is no predefined information transmission procedure between the processing program 161 and the information transmission server 15, and the payload is simply needed to be transmitted to a certain region of an interface of the processing program 161, the forwarding program 162 may operate as an input device like a virtual keyboard (Type 01).

In this case, the information transmission server 15 may transmit to the forwarding program 162 an instruction to key-in the payload from a cursor position in an input window executed by the processing program 161.

Further, the forwarding program 162, which receives such an instruction from the information transmission server 15, inputs the received payload via a keyboard input manner from the cursor position in the input window currently displayed on the destination terminal 16. For example, when the payload is a member ID for which a certain reward is to be deposited and the member ID is "019987482094", the forwarding program 162 enters "019987482094" from the cursor position in the input window of the destination terminal 16 according to the instruction received from the information transmission server 15.

Alternatively, the information transmission server 15 may transmit an instruction to execute the processing program 161 corresponding to the information transmission application ID first, and then to key the payload from the cursor position. Specifically, as a service provider who has distributed the information transmission application is the same as a service provider who has distributed the processing program 161, if the information transmission application ID is known to the information transmission server 15, the installed processing program 161 corresponding thereto can be known to or identified by the information transmission server 15.

In addition, the information transmission server 15 may transmit an instruction to activate and display an input pop-up window corresponding to the information transmission application ID at the destination terminal 16, and then to key the payload from the cursor position of the input pop-up window.

In another embodiment, the information transmission procedure is predefined between the processing program 161 installed in the destination terminal 16 and the information transmission server 15 (Type 02). In this case, the information transmission server 15 transmits an instruction to perform the predefined information transmission procedure to the forwarding program 162. The forwarding program 162 receiving the instruction from the information transmission server 15 may transmit the payload to the processing program 161 by performing the predefined procedure.

In still another embodiment, an attribute of the processing program 161 executed in the destination terminal 16 is known to the information transmission server 15 (Type 03). Even though the information transmission procedure is not predefined between the processing program 161 and the information transmission server 15, when the attribute of the processing program 161 is already known to the information transmission server 15, the information transmission server 15 may set up a manner in which certain information is entered to the processing program 161. Therefore, the information transmission server 15 transmits to the processing program 162 an instruction to transmit the payload in accordance with the manner in which the certain information is entered into the processing program 161, and the forwarding program 162 transmits the payload to the processing program 161 by executing the instruction received from the information transmission server 15.

For example, when the processing program 161 is an internet browser installed on a personal computer (PC), configurations of controls (e.g., input windows, selection tabs, pictures, texts, etc.) in the browser may be identified or determined in advance through an analysis of the browser. Therefore, when the processing program 161 is "Chrome," which is the internet browser, information input controls of Chrome browser may be identified in advance, and an instruction for enabling the transmission of the payload to the information input controls may be generated and transmitted to the forwarding program 162.

FIG. 2 illustrates a process of transmitting an instruction at an information transmission server according to an embodiment of the present invention.

Referring to FIG. 2, the information transmission server 15 receives the destination terminal ID and the payload transmitted from the smartphone 13 (S201). Further, the information transmission server 15 may also receive the information transmission application ID.

The information transmission application ID is an identifier for indicating the application that transmits the payload.

The information transmission server 15 determines to which destination terminal 16 the payload is to be transmitted among a plurality of destination terminals 16 connected to the information transmission server 15 by using the destination terminal ID (S202).

Table 1 is an example of relationship between the type of the processing program that the destination terminal may include and the instruction to be executed by the forwarding program.

TABLE 1

| Destination terminal ID | Type of processing program | Information transmission application ID | Instruction |
|---|---|---|---|
| 894939202 | 01 | 017 | Execute a processing program corresponding to an application ID 017<br>Input a payload from a cursor position |
| 937759627 | 01 | 056 | Input a payload from a cursor position |
| 856738289 | 03 | 012 | Search for a processing program corresponding to an application ID 012<br>Activate the searched program<br>Transmit a payload according to an information transmission procedure which corresponds to the activated program |
| 826358223 | 02 | 003 | Search for a processing program corresponding to an application ID 003<br>Transmit a payload according to a predefined procedure |
| 087625822 | 02 | 014 | Search for a processing program corresponding to an application ID 014<br>Transmit a payload according to a predefined procedure |
| 726589123 | 01 | 031 | Activate a window for inputting a reward<br>Move a cursor to a left end of the window, while deleting previously inputted text<br>Input a payload |

TABLE 1-continued

| Destination terminal ID | Type of processing program | Information transmission application ID | Instruction |
|---|---|---|---|
| 382762345 | 01 | 001 | Activate a window for inputting a reward Input a payload from a cursor position |
| — | — | — | — |

The information transmission server 15 preferably has an instruction table corresponding to the destination terminal ID as shown in above Table 1.

The information transmission server 15 identifies the processing program 161 which is to receive the payload, using the information transmission application ID (S203). When the information transmission server 15 identifies the processing program 161 to receive the payload, the information transmission server 15 generates an instruction corresponding to the identified processing program 161 (S204).

The information transmission server 15 transmits the generated instruction and the payload to the target destination terminal 16 (S205), and the instruction is executed by the forwarding program 162 of the destination terminal 16.

Particularly, the forwarding program 162 is a program capable of executing any instructions while running in a background of the destination terminal 16, and is agent software preferably.

As described above, the information transmission server 15 of the present invention may identify the processing program 161 to receive the payload in advance, generate the instruction for transmitting the information to the processing program 161, and allow the transmission program 162 to receive and execute the generated instruction. Therefore, the information transmission server 15 causes the payload to be accurately transmitted to the desired processing program 161 regardless of the types of the processing program 161, such that the payload is properly processed by the processing program 161 in the destination terminal 16.

FIG. 3 illustrates a signal processing diagram of an information transmission method according to an embodiment of the present invention.

As shown in FIG. 3, the user executes the information transmission application to transmit the information stored in the mobile terminal, i.e. the smartphone 13 to the destination terminal 16 (S301). When the user tags the smartphone 13 on the destination terminal ID provider, i.e., the NFC tag 14, the destination terminal ID stored in the NFC tag 14 is transmitted to the smartphone 13 (S302).

The information transmission application of the smartphone 13 transmits the destination terminal ID and the payload (i.e., the information to be transmitted to the destination terminal) to the information transmission server 15 (S303). Simultaneously, the information transmission application ID may also be transmitted to the information transmission server 15 along with the destination terminal ID and the payload.

The information transmission server 15 determines to which destination terminal 16 the payload is transmitted from among a plurality of destination terminals 16 connected to the information transmission server 15 by using the destination terminal ID received from the smartphone 13 (S304).

The information transmission server 15 generates an instruction corresponding to the processing program 161 which is supposed to receive the payload at the destination terminal 16 (S305). For example, the information transmission server 15 may generate an instruction defining how to enter the payload into the processing program 161. Then, the information transmission server 15 transmits the instruction and the payload to the forwarding program 162 in the destination terminal 16 (S306).

The forwarding program 162 of the destination terminal 16 executes the received instruction (S307) and transmits the payload to the processing program 161 as defined by the instruction (S308).

The system and method as described above may be applied to the transmitting of information for the various functions or services such as the user authentication, the payment, the data streaming, and so on. Any information received at the destination terminal 16 via the system and method according to the present invention may be further processed for such functions or services as intended. For example, the information received at the destination terminal 16 may be decoded and/or visually displayed at the destination terminal 16 to achieve or provide the intended functions or services. In addition, the received information may be further transmitted from the destination terminal 16 to any external devices or terminals for any additional functions or services.

Hereinafter, a method for transmitting payment information will be described as an example of the information transmission method according to the present invention. Since information to be transmitted from the smartphone to the destination terminal is the payment information, the information transmission application of FIGS. 1 and 2 corresponds to a payment service application in this embodiment.

FIG. 4 illustrates a process of downloading a payment service application for transmitting payment information according to an embodiment of the present invention.

As shown in FIG. 4, a payment service provider 42 develops a payment service application having a payment service function and uploads the payment service application to an application server 41. The payment service application has a payment service application ID and an execution file for transmitting the payment information.

Meanwhile, when the payment service application has already been uploaded to the application server 41, the payment service provider 42 may access the application server 41 and update the payment service application. The updated payment service application also has the payment service application ID and the execution file for the transmission of the payment information. The execution file for the payment information transmission may be configured in a library format in an application or a program of the mobile terminal.

A user may download and install the payment service application by accessing the application server 41 through a mobile terminal, e.g., a smartphone 43.

Alternatively, when the payment service application is already installed in the user's smartphone 43, the payment service application is configured to update itself to have the payment service application ID and the execution file for the payment information transmission.

FIG. 5 illustrates a process of authenticating a transaction using a transaction code.

As shown in FIG. 5, when the user runs the payment service application on the smartphone 43 and completes a user authentication process for logging in the payment service application, the smartphone 43 transmits to a payment authentication server 47 a credit card ID and user authentication information in order to receive a transaction code.

In a process of registering information of the user's credit card through the payment service application, the credit card ID has already been generated corresponding to the user's actual credit card number. The generated credit card ID is stored in the smartphone 43 and the payment authentication server 47.

The payment authentication server 47 authenticates whether the user (i.e., the smartphone 43) which has requested the transaction code is legitimate by using the authentication information transmitted from the user's smartphone 43, and checks or confirms whether the credit card ID received from the smartphone 43 matches the credit card ID previously generated during credit card registration.

When the user authentication and the credit card ID confirmation are completed, the payment authentication server 47 generates and stores a transaction code corresponding to the credit card ID received from the smartphone 43. Then, the transaction code generated by the payment authentication server 47 is transmitted to the user's smartphone 43.

When the transaction code received at the smartphone 43 is transmitted or returned to the payment authentication server 47 via a merchant terminal 16 by the smartphone 43, the payment authentication server 47 checks whether the transaction code received from the smartphone 43 matches the transaction code which has been transmitted to the smartphone 43. When the matching is confirmed, the payment authentication server 47 transmits the actual credit card number corresponding to the received transaction code to a payment approval server 48.

In some implementations, the transaction code is a code used for the transaction authentication, and may be generated by changing only the remaining 10 digits while leaving 6 digits as it is from the actual credit card number consisting of 16 digits. Further, the transaction code may also be generated by adding a specific identification code which indicates "transaction code" to the 16-digit actual credit card number.

The generated transaction code is stored in the payment authentication server 47, and the generated transaction code corresponds to the actual credit card number and the credit card ID. As the transaction code may be generated and stored for each transaction in correspondence with the actual credit card number and the card ID, the payment authentication server 47 may store a plurality of transaction codes corresponding to one actual credit card number and one credit card ID. When the transaction is canceled, a transaction corresponding to the transaction code is processed to be canceled.

Table 2 shows an example of a manner in which the transaction codes are generated and stored in the payment authentication server 47 with regard to the actual credit card number and the credit card ID.

TABLE 2

| | | | |
|---|---|---|---|
| User 1 | Actual credit card number #1 | Credit card ID #1 | Transaction code #1<br>Transaction code #2<br>Transaction code #3<br>Transaction code #4 |
| | Actual credit card number #2 | Credit card ID #2 | Transaction code #1<br>Transaction code #2 |
| User 2 | Actual credit card number #1 | Credit card ID #3 | Transaction code #1<br>Transaction code #2 |

The user may register the user's credit card used for the transaction on the payment authentication server 47 using the payment service application in advance. When the user registers the user's own credit card on the payment authentication server 47 using the payment service application of the smartphone 43, the credit card ID corresponding to the actual credit card number may be generated and stored in the payment authentication server 47, as shown in Table 2.

As shown in Table 2, the user may use a plurality of credit cards, and thus a plurality of actual credit card numbers may be registered for one user. Further, as the transaction code may be generated for each transaction, a plurality of transaction codes corresponding to one actual credit card number may be generated and stored.

FIG. 6 illustrates a payment information transmission system according to an embodiment of the present invention.

In the payment information transmission system of FIG. 6, the payload in FIGS. 1 and 2 corresponds to the transaction code, and the destination terminal ID provider 14 and the destination terminal 16 in FIGS. 1 and 2 correspond to a merchant terminal ID provider 44 and a merchant terminal 46, respectively.

As shown in FIG. 6, the payment information transmission system according to one embodiment of the present invention includes a user's smartphone 43, a merchant terminal ID provider 44, a payment information transmission server 45, a merchant terminal 46, a payment authentication server 47, and a payment approval server 48.

The merchant terminal ID provider 44 stores an identifier uniquely assigned to each merchant terminal 46.

The merchant terminal 46 may correspond to a device for processing an order and a payment in an offline store. In the following example, the merchant terminal 46 is a point of sale (POS) system, the merchant terminal ID provider 44 is a near field communication (NFC) tag, and a processing program 461 is a POS program.

The merchant terminal ID provider 44 performs a function of storing the merchant terminal ID for identifying the merchant terminal 46 and providing the stored merchant terminal ID to the smartphone 43, but does not transmit any information to the merchant terminal 46 directly. Thus, the merchant terminal ID provider 44 is not directly connected to the merchant terminal 46 in a wired or wireless manner.

When the user executes the payment service application installed on the user's own smartphone 43, completes the user authentication, and then requests the transaction code to the payment authentication server 47 for the payment at the offline retail store, the payment authentication server 47 generates the transaction code and forwards the generated transaction code to the smartphone 43.

Then, when the user tags the user's own smartphone 43 on the merchant terminal ID provider 44 which is the NFC tag, the smartphone 43 acquires the merchant terminal ID from the provider 44.

Then, for further processing the payment, the payment service application running on the user's smartphone 43 transmits to the payment information transmission server 45, the transaction code and the merchant terminal ID via a wireless network. At the same time, the payment service application ID may be transmitted to the payment information transmission server 45 along with the transaction code and the merchant terminal ID. The wireless network may be a cellular network or a Wi-Fi network, or may also be any networks that the smartphone 43 may access wirelessly.

When the payment information transmission server 45 receives the merchant terminal ID from the smartphone 43, the payment information transmission server 45 determines using the merchant terminal ID, which merchant terminal 46 the received transaction code is transmitted to, among a plurality of merchant terminals 46 connected to the payment information transmission server 45.

Further, the payment information transmission server 45 generates an instruction to be executed by a forwarding program 462, according to the processes as described in FIGS. 1 and 2. Then, the payment information transmission server 45 transmits such an instruction along with the transaction code to the forwarding program 462 in the merchant terminal, i.e., the POS system 46.

The forwarding program 462 transmits the transaction code to the processing program, i.e., the POS program 461 in the POS system 46 by executing the received instruction. Since the instruction received by the forwarding program 462 is generated to correspond to the POS program 461, the transaction code received from the payment information transmission server 45 may be accurately transmitted to the POS program 461, when the forwarding program 462 executes such an instruction.

FIGS. 7 and 8 illustrate a process of transmitting the transaction code to the POS program according to an embodiment of the present invention.

When the forwarding program 462 of the merchant terminal 46 receives the transaction code and the instruction from the payment information transmission server 45, the forwarding program 462 activates a payment window of a payment service provider, e.g., "KakaoPay" according to the received instruction, as shown in FIG. 7. Then, as shown in FIG. 8, the forwarding program 462 inserts the transaction code into a cursor position of the payment window as defined by the received instruction.

Subsequently, the POS program 461 of the merchant terminal 46 receiving the transaction code transmits the transaction code to the payment authentication server 47. The payment authentication server 47 checks whether the transaction code received from the merchant terminal 46 matches the transaction code previously generated by the payment authentication server 47 and transmitted to the user's smartphone 43.

When the matching is confirmed, the payment authentication server 47 transmits an actual credit card number corresponding to the transaction code to the payment approval server 48.

FIG. 9 is a signal processing diagram of the payment information transmission system in FIG. 6.

Referring to FIG. 9, when the user runs the payment service application installed on the user's smartphone 43 for the payment (S901), the payment service application transmits the user authentication information to the payment authentication server 47 to request the transaction code (S902).

The payment authentication server 47 authenticates the user of the smartphone 43 using the received user authentication information (S903), and generates and stores the transaction code (S904). The payment authentication server 47 then transmits the generated transaction code to the user's smartphone 43 (S905).

The user's smartphone 43 acquires the merchant terminal ID from the merchant terminal ID provider 44, e.g., the NFC tag 44 when the user places the smart phone 43 on the NFC tag 44 (S906).

The smartphone 43 transmits to the payment information transmission server 45, the transaction code received from the payment authentication server 47, the merchant terminal ID acquired from the NFC tag 44, and the payment service application ID (S907).

The payment information transmission server 45 determines to which POS system 46 among a plurality of POS system 46 connected to the server 45, the transaction code should be transmitted, based on the received merchant terminal ID (S908).

Further, the payment information transmission server 45 generates an instruction that corresponds to the POS program 461, using the information like Table 1 which is stored in the payment information transmission server 45 in advance (S909).

The payment information transmission server 45 transmits the transaction code and the generated instruction to the forwarding program 462 which functions as an agent software of the POS system 46 (S910). Then, the agent software 462 executes the received instruction (S911), and transmits the transaction code to the POS program 461 (S912).

The POS program 461 transmits the transaction code received from the agent software 462 to the payment authentication server 47 (S913), and the payment authentication server 47 checks whether the received transaction code matches the transaction code generated at step S904 (S914).

When the matching is confirmed, the payment authentication server 47 searches for the actual credit card number corresponding to the transaction code, referring to Table 2, and transmits the searched credit card number to the payment approval server 48 (S915).

Although a number of examples have been described, it should be understood that other modifications and implementations can be devised by those skilled in the art that will fall within the spirit and scope of the principles of the present invention. More particularly, various variations and modifications in the structure or the configuration are possible within the scope of the disclosure, the drawings and the appended claims. In addition to variations and modifications in the configuration, alternative uses will also be apparent to those skilled in the art.

The invention claimed is:

1. A method for transmitting information using a mobile terminal, the method comprising:
receiving, by an information transmission server, a payload and a destination terminal ID from the mobile terminal;
receiving, by the information transmission server, an information transmission application ID from the mobile terminal, wherein the information transmission application ID is an identifier of an information transmission application which is installed at the mobile terminal and is configured to transmit the payload to the information transmission server;
determining, by the information transmission server, a destination terminal to which the payload is to be transmitted, using the destination terminal ID;
identifying, by the information transmission server, a processing program corresponding to the information transmission application ID, wherein the identified processing program is installed at the destination terminal and is compatible with the payload;
generating, by the information transmission server, an instruction instructing to execute the identified processing program and defining how to enter the payload into the processing program;
transmitting, by the information transmission server, the instruction and the payload to forwarding program installed at the destination terminal;

executing, by the forwarding program, the identified processing program according to the instruction; and entering, by the forwarding program, the payload into the executed processing program according to the instruction such that the payload is properly processed by the processing program.

2. The method of claim 1, wherein the forwarding program comprises agent software.

3. The method of claim 1, wherein the destination terminal ID comprises a near field communication (NFC) tag ID.

4. The method of claim 1, wherein the payload includes a transaction code.

5. The method of claim 1, wherein the payload includes membership information.

6. The method of claim 1, wherein the destination terminal comprises a point of sales (POS) system.

7. A system for transmitting information using a mobile terminal, the system comprising:
  a destination terminal ID provider configured to store a destination terminal ID and to provide the destination terminal ID to the mobile terminal;
  a destination terminal configured to correspond to the destination terminal ID; and
  an information transmission server configured to:
    receive a payload and the destination terminal ID from the mobile terminal;
    receive an information transmission application ID from the mobile terminal, wherein the information transmission application ID is an identifier of an information transmission application which is installed at the mobile terminal and is configured to transmit the payload to the information transmission server;
    determining the destination terminal using the destination terminal ID;
    identify a processing program corresponding to the information transmission application ID, wherein the identified processing program is installed at the destination terminal and is compatible with the payload;
    generate an instruction instructing to execute the identified processing program and defining how to enter the payload into the processing program; and
    transmit the instruction and the payload to a forwarding program installed at the destination terminal,
  wherein the forwarding program is configured to:
    execute the identified processing program according to the instruction; and
    enter the payload into the executed processing program according to the instruction such that the payload is properly processed by the processing program.

8. The system of claim 7, wherein the forwarding program comprises agent software.

9. The system of claim 8, wherein the instruction is configured to cause the agent software to transmit the payload to the processing program in a key-in manner.

10. The system of claim 8, wherein the instruction is configured to cause the agent software to transmit the payload to the processing program according to a processing procedure predefined between the processing program and the information transmission server.

11. The system of claim 8, wherein the instruction is configured to cause the agent software to transmit the payload to the processing program according to a processing procedure based on an attribute of the processing program.

12. The system of claim 7, wherein the destination terminal ID comprises a NFC tag ID.

13. The system of claim 7, wherein the payload includes a transaction code.

14. The system of claim 7, wherein the payload includes membership information.

15. The system of claim 7, wherein the destination terminal comprises a POS system.

* * * * *